United States Patent
Pincemin et al.

(10) Patent No.: US 10,797,819 B2
(45) Date of Patent: Oct. 6, 2020

(54) METHOD AND DEVICE FOR CONTROLLING THE LOAD OF AN OPTICAL TRANSMISSION LINE WITH WAVELENGTH-DIVISION MULTIPLEXING

(71) Applicant: Orange, Paris (FR)

(72) Inventors: Erwan Pincemin, Chatillon (FR); Yann Loussouarn, Chatillon (FR)

(73) Assignee: ORANGE, Paris (FR)

(*) Notice: Subject to any disclaimer, the term of this patent is extended or adjusted under 35 U.S.C. 154(b) by 0 days.

(21) Appl. No.: 16/333,426

(22) PCT Filed: Sep. 14, 2017

(86) PCT No.: PCT/FR2017/052460
§ 371 (c)(1),
(2) Date: Mar. 14, 2019

(87) PCT Pub. No.: WO2018/051028
PCT Pub. Date: Mar. 22, 2018

(65) Prior Publication Data
US 2019/0253174 A1 Aug. 15, 2019

(30) Foreign Application Priority Data

Sep. 16, 2016 (FR) .................................... 16 58675

(51) Int. Cl.
*H04B 10/516* (2013.01)
*H04J 14/02* (2006.01)

(52) U.S. Cl.
CPC ........ *H04J 14/0227* (2013.01); *H04B 10/516* (2013.01); *H04J 14/0221* (2013.01)

(58) Field of Classification Search
CPC .... H04J 14/02; H04J 14/0221; H04J 14/0227; H04B 10/516
See application file for complete search history.

(56) References Cited

U.S. PATENT DOCUMENTS

| 8,971,705 B2 | 3/2015 | Boertjes et al. |
| 2012/0087658 A1* | 4/2012 | Jander ............... H04J 14/02 398/48 |

(Continued)

FOREIGN PATENT DOCUMENTS

| EP | 2784961 A2 | 10/2014 |
| WO | 2006031340 A2 | 3/2006 |
| WO | 2013170909 A1 | 11/2013 |

OTHER PUBLICATIONS

International Search report dated Nov. 24, 2017 for corresponding International Application No. PCT/FR2017/052460, filed Sep. 14, 2017.

(Continued)

*Primary Examiner* — Dzung D Tran
(74) *Attorney, Agent, or Firm* — David D. Brush; Westman, Champlin & Koehler, P.A.

(57) ABSTRACT

A load-controlling device controlling load on an optical transmission line, the input of which is coupled to an emitting device for modulating with data and multiplexing a plurality of useful wavelengths into a useful optical signal to be transmitted over the transmission line. The load-controlling device includes elements for generating a filler optical signal composed of at least one filler wavelength that is not modulated by data, to be injected into the optical transmission line. The generating elements generate a source optical signal composed of a plurality of wavelengths corresponding to the plurality of wavelengths of the useful optical signal and selects the wavelength of the filler optical signal among the wavelengths of the source optical signal. A control module controls selection of the wavelength of the filler optical signal depending on information indicative of non-turn-on of a wavelength among the plurality of wavelengths of the useful optical signal.

16 Claims, 2 Drawing Sheets

(56) References Cited

U.S. PATENT DOCUMENTS

| | | | |
|---|---|---|---|
| 2014/0286635 A1* | 9/2014 | Kaneko | H04J 14/0221 398/34 |
| 2015/0132009 A1* | 5/2015 | Yuki | H04J 14/0212 398/135 |
| 2018/0070156 A1* | 3/2018 | Kawai | H04B 10/032 |

OTHER PUBLICATIONS

Written Opinion of the International Searching Authority dated Nov. 24, 2017 for corresponding International Application No. PCT/FR2017/052460, filed Sep. 14, 2017.

English translation of the Written Opinion of the International Searching Authority dated Nov. 24, 2017 for corresponding International Application No. PCT/FR2017/052460, filed Sep. 14, 2017.

Morohashi et al., "1-THz bandwidth optical comb generation using Mach-Zehnder modulator-based flat comb with generator optical feedback loop", OFC/NFOEC 2011, paper JThA29.

Xie et al., "50-GHz optical frequency comb generation based on an optoelectronic resonator", International Frequency Control Symposium 2014.

* cited by examiner

METHOD AND DEVICE FOR CONTROLLING THE LOAD OF AN OPTICAL TRANSMISSION LINE WITH WAVELENGTH-DIVISION MULTIPLEXING

CROSS-REFERENCE TO RELATED APPLICATIONS

This Application is a Section 371 National Stage Application of International Application No. PCT/FR2017/052460, filed Sep. 14, 2017, the content of which is incorporated herein by reference in its entirety, and published as WO 2018/051028 on Mar. 22, 2018, not in English.

FIELD OF THE DISCLOSURE

The present invention relates to the field of the transmission of wavelength-division-multiplexed (WDM) optical signals, and more particularly to the management of the optical load on the optical lines that transport such signals.

BACKGROUND OF THE DISCLOSURE

WDM transmission systems are conventionally dimensioned to transport a certain number of wavelengths in the amplification band of the optical amplifiers (e.g. EDFAs) placed along this system, i.e. typically between 80 and 100 WDM channels arranged in a set wavelength-allocation grid, or indeed a mixture of standard single-wavelength channels and "super-channels", which are composed of a plurality of wavelengths and form one and the same optical channel in a flexible wavelength-allocation grid.

However, at the start of the life of a WDM transmission system (i.e. on its initial deployment), this system is most of the time "under loaded", the operator initially having no need to use each and every wavelength. This under loading of the system may have disadvantageous repercussions on the operation of the optical amplifiers, in particular causing problems with gain flatness, an increase in noise factor, or indeed even a non-optimized power per channel at the output of the amplifier.

By way of example, a WDM system may initially transport only 40 wavelengths at 10 Gbps even though it was dimensioned to transport 80 WDM channels. In this particular case, the 40 10 GBps WDM channels used will have a nominal power 3 dB higher than the nominal power expected by the engineer on deployment of the system. Problems may then arise when, subsequently, additional 100 GBps WDM channels are inserted. Nonlinear effects induced by transmission through the optical fiber then explode and the new 100 GBps channels, in particular when they use a coherent DP-QPSK modulation, are highly affected by nonlinear effects such as cross phase modulation due to 10 GBps channels implementing NRZ-OOK modulation. This significantly decreases the range of the 100 Gbps WDM channels, and therefore makes it necessary to regenerate these channels more often, which is particularly expensive to do at these transfer rates.

Patent application WO 2006/031340 describes a spectral architecture for loading WDM transmission systems, using an optical loading device that is placed at the input of an optical line and that injects optical signals at wavelengths that are not used to transport information, in particular in order to maintain the amplifiers of the optical line at a certain saturation level.

However, in this document, the optical loading device is implemented in the form either of a combination of a multitude of fixed-wavelength lasers, or of a noise source associated with an optical interleaving filter, and thus has a preset structure that must be specifically defined to match the optical emitters used for the line in question. Thus, a number of loading lasers equal to the number of lasers that are sources of information must be provided in the first case whereas, in the second case, the optical interleaving filter must be specifically chosen depending on the number of lasers that are sources of information.

Not only is such a system difficult to implement, cannot be industrialized on a large scale and not adapted to the diversity of deployed WDM optical emitters, but it is also furthermore not capable of flexibly adapting to dynamic modifications at the level of the component optical emitters of a WDM emitter, in particular a change in the number of these emitters, a change in the type of modulation employed by one of these emitters or a change in the spectral spacing between the wavelengths emitted by two spectrally neighboring emitters. In case of such a change, a manual intervention is then required to replace, remove or add loading lasers, or to replace the optical interleaving filter, this also proving to be expensive. Such a manual intervention requires an interruption of the WDM system carrying the traffic during the modification or the update of the optical loading system.

SUMMARY

The aim of the present invention is to remedy such drawbacks, by providing a device and a method for loading an optical line of a WDM system, allowing this optical line to permanently operate fully loaded, the device being able to adapt to various optical-emitter configurations, thereby ensuring that a WDM transmission system, once the latter has been deployed, can, over time, be used flexibly.

More particularly, the present invention relates to a load-controlling device for controlling the load on an optical transmission line the input of which is coupled to an emitting device suitable for modulating with data and multiplexing a plurality of what are called useful wavelengths into a useful optical signal to be transmitted over the optical transmission line, the load-controlling device comprising means for generating a filler optical signal, which is composed of at least one filler wavelength that is not modulated by data, to be injected into the optical transmission line. In this load-controlling device the generating means are configured to generate at least one source optical signal composed of at least a plurality of wavelengths corresponding to the plurality of wavelengths of the useful optical signal and to select said at least one wavelength of the filler optical signal among the wavelengths of the at least one source optical signal. In addition, this load-controlling device comprises a control module configured to control the selection, by the generating means, of the at least one wavelength of the filler optical signal depending on first information that is indicative of the non-turn-on of at least one wavelength among the plurality of wavelengths of the useful optical signal.

Such a load-controlling device is able not only to adapt to any type of WDM transmission system having a particular configuration from the spectral point of view on its initial deployment, but also to simply and flexibly adapt, without recourse necessarily needing to be made to a manual intervention, to changes that may be made to this configuration during the lifetime of the system.

According to one particular embodiment, the generating means comprise at least one module for generating a source optical signal controlled by the control module and one wavelength-selecting module configured to receive the source optical signal and to select, on command from the control module, the at least one filler wavelength of the filler optical signal among the wavelengths of the at least one source optical signal. Such an implementation provides for increased flexibility by allowing separate control of, on the one hand, the actual generation of said filler optical signal and of the wavelengths that compose it, and, on the other hand, the selection of the filler wavelengths to be used to load the WDM system.

Advantageously, the selecting module is furthermore configured to adjust the power level of said at least one wavelength of the selected filler optical signal depending on information relating to the emission power level of the useful wavelengths, this allowing the power of the components of the filler signal to be adjusted depending on the power of the components of the useful signal, in order for example to limit nonlinear effects that would otherwise affect these components during transmission through the optical line.

Advantageously, the above control module may furthermore be configured to control the generation of the wavelengths of the source optical signal corresponding to the wavelengths of the useful optical signal depending on second information relating to all of the useful wavelengths. In particular, this second information may comprise information relating to the spectral spacing between the useful wavelengths, to a reference wavelength and/or to the spectral position of each useful wavelength. The use of information of such type facilitates the generation of a filler optical signal suitable for the useful WDM signals employed in the transmission system.

In one particular embodiment, the above module for generating the source optical signal comprises a broad spectrum optical source coupled to a periodic filter having a free spectral range managed by the control module in order to control the adjustment of the spectral spacing between the wavelengths of the source optical signal. Such an implementation proves, in terms of flexibility, to be particularly advantageous for obtaining a filler optical signal that precisely matches the useful WDM signal employed in the transmission system.

According to another embodiment, the above wavelength-selecting module is a wavelength selective switch comprising attenuators commanded by the control module in order to turn off the wavelengths of the source optical signal that do not correspond to a non-turned-on useful wavelength. The use of such an implementation is particularly advantageous, in terms of flexibility and of ability to make dynamic adjustments, with respect to the function performing selection of the filler wavelengths to be injected into the transmission system.

According to one advantageous embodiment, the control module is configured to receive the first information and/or the second information from a control module for controlling the optical emitters of the emitting device. Creating this direct relationship between the load-controlling device and the transmission system to be loaded makes it possible to ensure that the filler signal to be injected may be suitably adapted in almost real-time.

In one particular embodiment, the information indicative of the non-turn-on useful of at least one useful wavelength comprises a list of turned-on wavelengths and/or a list of the non-turned-on wavelengths of the plurality of useful wavelengths. This type of parameter allows the filler wavelengths to be injected to be simply and directly determined.

Another subject of the invention consists in a system for emitting an optical signal to be transmitted over an optical transmission line, comprising an emitting device, suitable for modulating and multiplexing a plurality of what are called useful wavelengths in order to deliver the optical signal to be transmitted over the optical transmission line and a load-controlling device such as described above, configured to inject a filler signal into the optical transmission line.

Another subject of the invention consists in a load-controlling method for controlling the load on an optical transmission line that is coupled to an emitting device that is able to modulate and multiplex a set of what are called useful wavelengths in order to deliver a useful optical signal to be transmitted over the optical transmission line, comprising the following steps:

obtaining first information indicative of the non-turn-on of at least one wavelength among the set of useful wavelengths;

selecting, depending on the first information, at least one wavelength of a filler signal within at least one source optical signal comprising a plurality of wavelengths corresponding to the plurality of useful wavelengths;

generating a filler signal composed of said at least one selected wavelength; and injecting the filler signal into the optical transmission line.

According to one advantageous embodiment, this method furthermore comprises steps consisting in obtaining second information relating to all of the useful wavelengths and generating the source optical signal depending on said second information.

In one particular embodiment, the first information comprises a list of non-turned-on useful wavelengths or a list of turned-on useful wavelengths, optionally accompanied by information on the respective powers of the turned-on wavelengths optionally, and the second information comprises information relating to the spectral spacing ($\Delta\lambda_U$) between the useful wavelengths, to the reference wavelength and/or to the spectral position of each useful wavelength.

According to one particular embodiment, the obtainment of the first information and/or the second information comprises receiving said first information and/or second information from a control module for controlling the optical emitters of the emitting device.

BRIEF DESCRIPTION OF THE DRAWINGS

Other features and advantages of the invention will become apparent on reading the following detailed description of particular embodiments, which are given by way of nonlimiting example, and the appended figures, in which.

DETAILED DESCRIPTION OF ILLUSTRATIVE EMBODIMENTS

Figure 1:
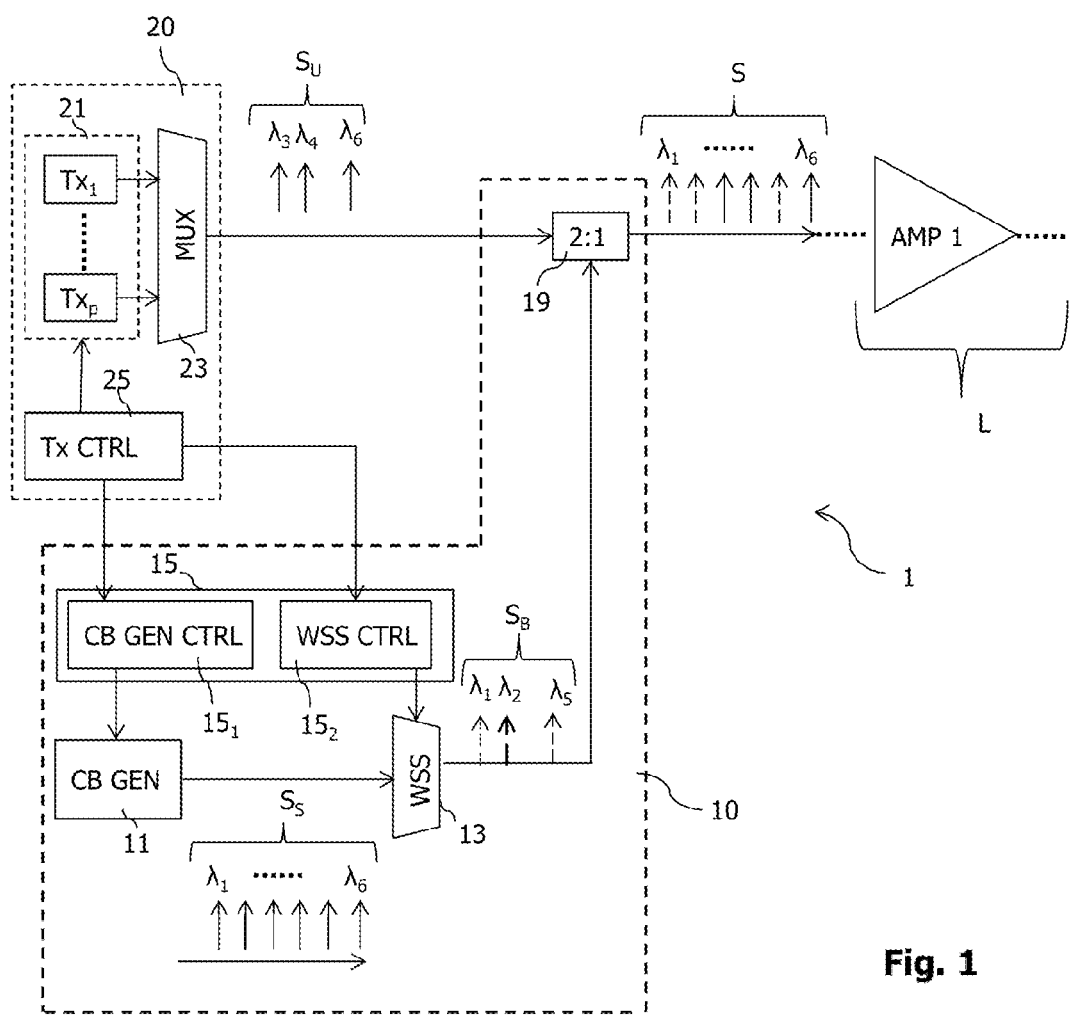
FIG. 1 schematically shows an optical transmission system in which a load-controlling device according to one embodiment of the invention is used.

FIG. 1, which illustrates an optical transmission system in which a load-controlling device according to one embodiment of the invention is used, will firstly be referred to.

This figure, i.e. FIG. 1, shows a WDM optical transmission system 1 comprising, on the one hand, a device 20 for emitting an optical signal, called the useful optical signal $S_U$, which may be composed of a plurality p of wavelengths $\lambda_{U,i}$, which are what are called useful wavelengths because they are able to be modulated by data to be transmitted in various modulation formats. This module 20 may thus comprise, by way of example of an implementation, p optical emitters 21, each capable of modulating one separate useful wavelength $\lambda_{U,i}$ with data to be transmitted, these emitters possibly being implemented in the form of laser diodes that are directly modulated with these data or of lasers combined with external modulators that are modulated with these data. The optical signals output from these p optical emitters 21 are then combined by an optical multiplexing module 23 (for example an AWG) in order to deliver the optical signal $S_U$ to be transmitted over the optical line L of the transmission system, which optical line typically takes the form of one- or two-way optical fibers combined with optical amplifiers, a single amplifier "AMP 1" being illustrated here. The useful wavelengths $\lambda_{U,i}$ are typically regularly spaced apart spectrally, by a spectral spacing $\Delta\lambda_U$ conventionally defined by a standard grid.

This device 20 may also comprise a control module 25 for controlling the optical emitters 21, said control module being configured to obtain a certain amount of information on these optical emitters 21, such as information on the turned-on or turned-off (i.e. non-turned-on) state of each of these optical emitters, the emission power (when turned on) and/or the wavelength $\lambda_{U,i}$ of each of these optical emitters, the spectral spacing $\Delta\lambda_U$ between the wavelengths $\lambda_{U,i}$, etc.

This information may be obtained by means of an optical spectral analyzer (OSA) that is coupled in shunt to the system 1 (via an optical coupler, for example a 10/90 optical coupler) and that measures these parameters and communicates the results of these measurements to the module 25.

This information may also be obtained by interrogating a device for managing the transmission system 1 (e.g. the module 25 transmits a request to this managing device in order that the latter returns this information thereto), which collects all the information on the wavelengths in service, this allowing this managing device or the module 25 to deduce the number of fully loaded WDM channels, the number of turned-on WDM channels, the wavelength of the WDM channels, the spacing between the turned-on WDM channels, the power of the turned-on WDM channels, inter alia. This control module 25 may also be configured to command these optical emitters to emit or not, or to adjust their optical power.

The system 1 also comprises a loading device 10 according to one embodiment of the present invention.

This device 10 comprises, on the one hand, means for generating an optical signal, called the filler optical signal $S_B$, which is composed of one or more wavelengths (called filler wavelengths), which are not modulated by data, this signal $S_B$ being intended to be injected into the optical transmission line L. The expression "filler optical signal" is understood to mean an optical signal that is not used to transport information or useful data, contrary to the signal $S_U$, but only to optically load the line L.

To obtain this signal $S_B$, these generating means are in particular configured to generate a first optical signal, called the source optical signal $S_S$, which comprises at least wavelengths corresponding to all the useful wavelengths $\lambda_{U,i}$ able to be emitted by the device 10. In one particular case, this source optical signal $S_S$ may only be composed of all of the useful wavelengths $\lambda_{U,i}$ able to be emitted by a particular device 20 with which the device 10 is to be associated. In another particular case, it may be composed by a larger set of wavelengths, among which wavelengths the useful wavelengths able to be emitted by various types of emitting devices may be found.

The generating means thus specifically adapt to the emitting device 10 at the input of the line L, by generating a source optical signal $S_S$ including the useful wavelengths specifically used by this device 10, on the basis of which these generating means will be able to obtain the filler signal $S_B$. To do this, once this source optical signal $S_S$ has been generated, these generating means are also configured to select the one or more filler wavelengths from the wavelengths of the source optical signal $S_S$, in order to form this signal $S_B$.

In one particular embodiment, the generating means may comprise two separate modules 11 and 13 that are associated together:

On the one hand, at least one module 11 for generating the source optical signal $S_S$;

On the other hand, a wavelength-selecting module 13 that is configured to receive this source optical signal $S_S$ and to select, on command by the control module 15, the one or more filler wavelengths among the wavelengths of the source optical signal $S_S$, in order to form the signal $S_B$.

The module 11 may be designated by the term "comb generator" in the sense that it generates a "comb" of wavelengths with a set number of "teeth" (i.e. the non-modulated wavelengths) and a set regular spacing between "teeth". By way of example, the number of wavelengths of such a comb may be 80, with a spacing between wavelengths of about 50 GHz.

Such a module 11 may be produced as described in the article "1-THz bandwidth optical comb generation using Mach-Zehnder modulator-based flat comb generator with optical feedback loop" (I. Morohashi et al., OFC/NFOEC 2011, paper JThA29), in the form of a Mach-Zehnder modulator (MZM) attacked with a sinusoidal RF signal at a frequency equal to the spacing between the wavelengths, the output signal of this MZM modulator then being circulated in an optical loop in order to be re-injected into the input of the MZM modulator. Because of this recirculation, on each passage through the MZM modulator, the number of wavelengths thus generated increases, this however being limited by the presence of a passband optical filter placed within the optical loop, an optical amplifier furthermore being added to the optical loop in order to compensate for the losses of the device, the passband of such a comb generator being unable to exceed that of this optical amplifier.

Alternatively, this module 11 may take the form of a phase modulator, such as that described in the article "50-GHz optical frequency comb generation based on an optoelectronic resonator" (X. Xie et al., International Frequency Control Symposium 2014) or one using the exacerbation of four-wave mixing (FWM) in low-chromatic-dispersion optical fibers such as described in the article "Frequency comb generation by four-wave mixing: the role of fiber dispersion" (G. A. Sefller et al., CLEO 1998, paper CFA8).

This module 11 may also be produced by coupling a broad spectrum optical source that is coupled to a periodic filter having a certain free spectrum range, which may be managed by the control module 15 in order to control the adjustment of the spectral spacing between the wavelengths of the source optical signal, typically by means of instruction messages transmitted from the module 15 to the periodic filter in order to control this free spectral range so that it coincides with the spectral spacing between useful wavelengths $\lambda_{U,i}$.

In FIG. 1, a single module 11 is shown, which delivers a signal $S_S$ composed of wavelengths that are spaced apart by a single spectral spacing. However, in order to be able to address the problem of flexible grids in WDM transmission systems and mixing within a given WDM system of grids of variable spacings, it is possible to use a plurality of modules 11, each delivering one source optical signal with a separate spectral spacing (for example two modules delivering signals of 50 GHz and 37.5 GHz spacing).

As for the wavelength-selecting module 13, it may in particular be implemented in the form of a wavelength selective switch (WSS) comprising attenuators able to be commanded, by a control module such as described below, to turn off the wavelengths of the source optical signal $S_S$ that do not correspond to a non-turned-on useful wavelength. This module 13 receives either a single signal source signal $S_S$ on one of its inputs when it is associated with a single module 11, or a plurality of source signals $S_S$ on a plurality of its inputs (a conventional WSS being able to comprise up to about twenty inputs) when it is associated with a plurality of modules 11 that generate source signals of different spectral spacing.

The device 10 may furthermore comprise a coupler 19 capable of receiving as input, on the one hand, the useful signal $S_U$ delivered by the emitting device 20 and, on the other hand, the filler signal $S_B$ delivered by the module 13. The coupler optically combines these two signals $S_U$ and $S_B$ in order to transmit them, in the form of a combined signal S, over the optical line L.

The device 10 furthermore comprises a control module 15 configured to control the selection, by the means for generating the optical signal, of the wavelengths of the filler optical signal $S_B$ depending on information indicative of the non-turn-on of one or more useful wavelengths $\lambda_{U\text{-}OFF}$, among all of the useful wavelengths $\lambda_{U,i}$ of the emitting device 20. Such a control module 15 may be implemented in the form of a processor associated with a memory and an interface for communicating with the generating means, in order to be able to send thereto commands determined by the processor depending on the information below.

In the embodiment in which the generating means comprise a module 11 for generating the source optical signal $S_S$ associated with a wavelength-selecting module 13, this control module 15 may comprise two submodules $15_1$ and $15_2$ that control the operation of the module 11 and of the module 13, respectively.

Thus, on the one hand, a first submodule $15_1$ may be configured to control the operation of the module 11 in order that the latter be able to generate a source signal $S_S$ composed of a set of wavelengths including the useful wavelengths $\lambda_{U,i}$ able to be emitted by the device 20. The submodule $15_1$ may in particular obtain information regarding all of the useful wavelengths $\lambda_{U,i}$ (in particular the list of these useful wavelengths $\lambda_{U,i}$, their number, their spectral positions, or even the spectral spacing $\Delta\lambda_U$ between these useful wavelengths when the latter are regularly spaced information) in order to be able to instruct the module 13 to generate a signal $S_S$ comprising wavelengths corresponding to these useful wavelengths $\lambda_{U,i}$. Thus, in one embodiment, the submodule $15_1$ may transmit to the module 13 a message with an instruction comprising two parameters, namely a spectral spacing $\Delta\lambda_S$ to be applied and a reference wavelength, these parameters being used by the module 13 to generate the signal $S_S$.

This submodule $15_1$ may thus in particular control the module 11 in order to adjust the spectral spacing $\Delta\lambda_S$ between the wavelengths of the source signal $S_S$, so that this spacing is substantially equal to the spectral spacing $\Delta\lambda_U$ between the wavelengths of the optical emitters 21. To do this, information on the spectral spacing $\Delta\lambda_U$ between the wavelengths of the optical emitters 21 may be obtained by the submodule $15_1$, which may then instruct the module 11 to increase or decrease the spectral spacing $\Delta\lambda_S$ so as to make it coincide with the spectral spacing $\Delta\lambda_U$.

This information relating to all of the useful wavelengths $\lambda_{U,i}$ may in particular take the form of a parameter identifying a WDM grid used by the wavelengths emitted by the optical emitters 21, for example identifying the use of a set 50 GHz grid (and therefore a grid with a spacing of 50 GHz between consecutive wavelengths) or identifying the parameter N of a grid that is flexible in steps of N×12.5 GHz.

Furthermore, the control module 15 may comprise a second submodule $15_2$ configured to control the selection, by the module 13, from among the wavelengths of the signal $S_S$, of the one or more wavelengths to be preserved to form the signal $S_B$ to be injected into the optical line L. To do this, information indicative of the non-turn-on of one or more wavelengths $\lambda_{U,OFF}$ among the useful wavelengths $\lambda_{U,i}$ of the emitting device 20 is obtained by the control module $15_2$ in order that the latter be able to select the wavelengths of the signals $S_S$ to be preserved to form the signal $S_B$.

This information may for example take the form of a list of non-turned-on wavelengths $\lambda_{U,OFF}$ among all of the useful wavelengths $\lambda_{U,i}$ of the emitting device 20, in which case the control submodule $15_2$ may directly select the wavelengths of the signal $S_S$ corresponding to these non-turned-on wavelengths and instruct the module 13 to preserve only those. Alternatively, this information may take the form of a list of turned-on wavelengths $\lambda_{U,ON}$ among all of the useful wavelengths $\lambda_{U,i}$ of the emitting device 20, in which case the control submodule $15_2$ may select all the wavelengths of the signal $S_S$ not corresponding to these turned-on wavelengths and instruct the module 13 to preserve only those.

Advantageously, information relating to the emission power level of the emitters of the turned-on useful wavelengths $\lambda_{U,ON}$ may also be obtained by the control module $15_2$, this information allowing the module $15_2$ to determine the power level of the wavelengths composing the signal $S_B$, for example in order to substantially align the power level of these wavelengths composing the signal $S_B$ with the emission power level of the useful channels carried by the useful wavelengths $\lambda_{U,i}$, when said power level is uniform for the various useful wavelengths, or even in order to compensate for the fact that certain useful channels have a different emission power level (for example a lower emission power level) than the others (for example channels having a bandwidth of 10 Gb/s with respect to channels having a bandwidth of 100 Gb/s) and thus limiting the non-linear propagation effects that this may engender.

All the above information may be received by the control module 15 from the control module 25 of the emitting device 20, after this module 25 has collected them, and for example after measurement by an optical spectral analyzer (measurements advantageously carried out in real-time) that measures these parameters at the level of the device 20. As has already been seen, this information may also be obtained by interrogating a managing device of the WDM system (e.g. the module 25 transmits a request to the managing device in order that the latter returns this information thereto), which collects all the information on the wavelengths in service, on the basis of which it is easily possible to deduce the number of fully loaded WDM channels, the number of turned-on WDM channels, the wavelength of these WDM channels, the spacing between the turned-on WDM channels, the power of the turned-on WDM channels, inter alia.

Thus, FIG. 1 illustrates a nonlimiting example in which the emitting device 20 is initially provided with 6 optical emitters 21, in order to be able to emit a WDM signal comprising up to 6 separate useful wavelengths to $\lambda_1$ to $\lambda_6$ (p=6). In a prior phase of installing the device 10, the submodule $15_1$ obtains information on the number and the value of the useful wavelengths $\lambda_1$ to $\lambda_6$ and commands the module 11 so that the latter generates, in operation, a source signal $S_S$ comprising wavelengths set to these wavelengths $\lambda_1$ to $\lambda_6$.

At a given time, for example on the first use thereof or indeed subsequently, this device 20 uses half of these provided wavelengths, i.e. only the optical emitters 21 using the wavelengths $\lambda_3$, $\lambda_4$ and $\lambda_6$ are turned on in order to emit a useful signal $S_U$, the other wavelengths $\lambda_1$, $\lambda_2$ and $\lambda_5$ thus being turned off at this given time.

When the submodule $15_2$ receives this information, it selects the wavelengths of the signal $S_S$ corresponding to the turned-off wavelengths $\lambda_1$, $\lambda_2$ and $\lambda_5$ and instructs the module 13 to filter (i.e. turn off) the other wavelengths of the signal $S_S$ in order to keep only those: the signal $S_B$ output from the module 13 thus comprises only the filler wavelengths $\lambda_1$, $\lambda_2$ and $\lambda_5$ (dashed arrows). This signal $S_B$ is then injected into the optical line L, by means of the coupler 19 that couples this signal $S_B$ to the useful signal $S_U$, so as to obtain a signal S composed both of the useful wavelengths $\lambda_3$, $\lambda_4$ and $\lambda_6$, which are emitted by the emitting device 20 (solid arrows) and which potentially carry useful data, and of the filler wavelengths $\lambda_1$, $\lambda_2$ and $\lambda_5$, which are generated by the load-controlling device 10 (dashed arrows).

This optical transmission line L thus receives a full wavelength load and does so whatever the number of wavelengths actually in service on the line. In particular, when all the wavelengths, i.e. all the useful and filler wavelengths, are emitted with the same emission power, the output power of the optical coupler 19 does not vary whatever the actual load in terms of service wavelengths on the WDM optical link.

Figure 2:
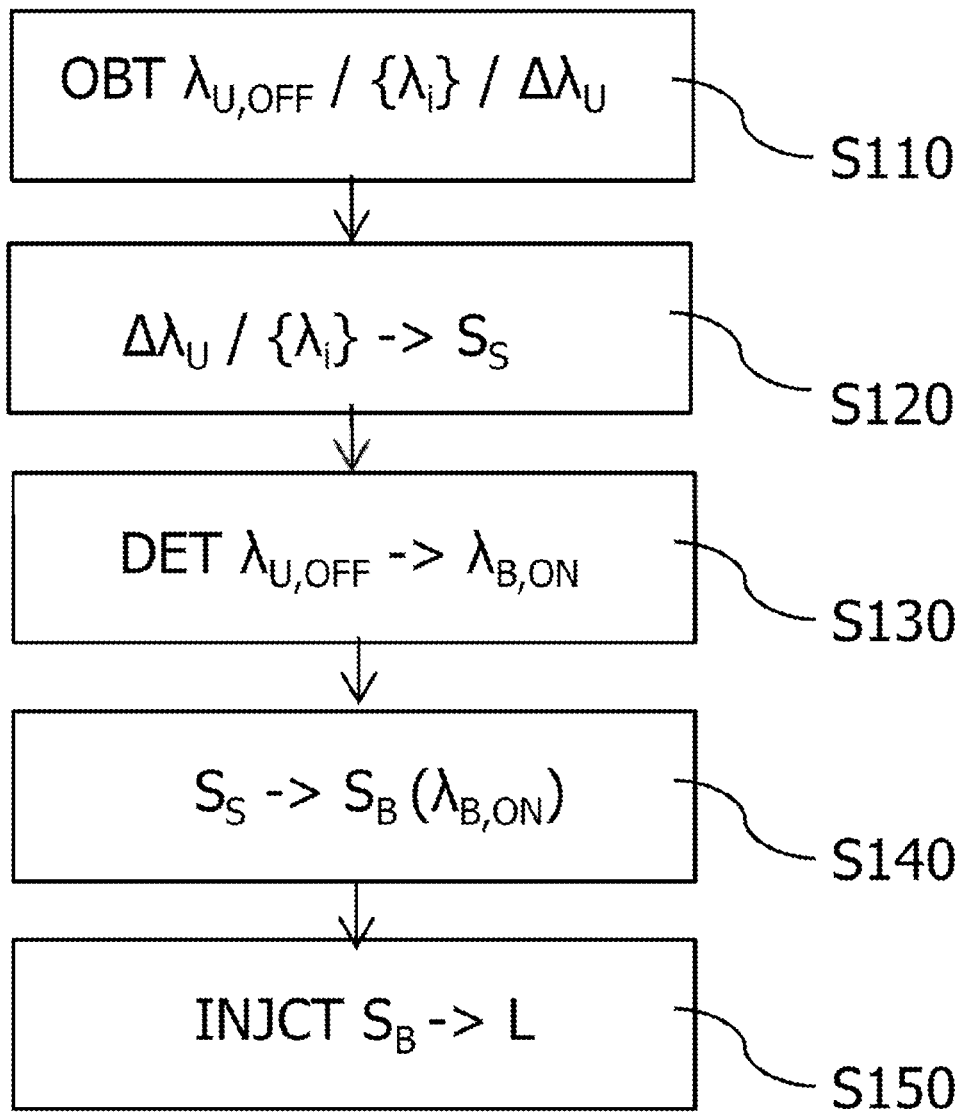
FIG. 2 illustrates the steps of a load-controlling method for controlling the load on an optical transmission line according to one embodiment of the invention.

Reference is now made to FIG. 2 in which a method for controlling the load on an optical transmission line according to one embodiment of the invention is illustrated.

According to this method, initially, one or more pieces of information relating to a device 20 for emitting wavelength-division-multiplexed optical signals, which device is coupled to the input of the optical line L the optical load of which is to be managed, are obtained (step S110), typically by the control module 15 of a load-controlling device 10 such as described above.

It is in particular a question of a first information indicative of the non-turn-on of one or more wavelengths $\lambda_{U-OFF}$ among all the useful wavelengths $\lambda_{U,i}$ that the emitting device 20 is capable of emitting, optionally taking the form of a list of the non-turned-on wavelengths with respect to this set of useful wavelengths or a list of the turned-on wavelengths with respect to the same set of useful wavelengths, this first information serving to determine the unused wavelengths able to be used as filler wavelengths. This first information may advantageously be completed by information on the respective emission power levels of the turned-on optical emitters, this complementary information allowing, where appropriate, the power level of the components of the filler signal $S_B$ to be adjusted in order to limit non-linear propagation effects, such as seen above.

It may also advantageously be a question of second information relating to all of the useful wavelengths $\lambda_{U,i}$ able to be emitted by this emitting device, in particular a list of these useful wavelengths $\lambda_{U,i}$, their number, their spectral positions, or even the spectral spacing $\Delta\lambda_U$ between these useful wavelengths when the latter are regularly spaced. This information may in particular be obtained (optionally by direct measurement by an optical spectrum analyzer in real-time) by a control module 25 of the emitting device 20, which is then tasked with transmitting it to the control module 15 of the loading device 10 according to the present invention.

The second information may then be used to generate (S120) a source optical signal $S_S$ comprising a plurality of wavelengths corresponding to the useful wavelengths $\lambda_{U,i}$. Thus, the optical source generating this signal $S_S$ may be adjusted so that the spectral spacing $\Delta\lambda_S$ between the wavelengths of the signal $S_S$ is substantially equal to the spectral spacing $\Delta\lambda_U$ indicated by this second information.

The first information indicative of the non-turn-on of one or more useful wavelengths $\lambda_{U-OFF}$ is, for its part, used to select (step S130) one or more wavelengths $\lambda_{B-ON}$ of a filler signal $S_B$ to be generated from the signal $S_S$. Complementary information on the emission power for the turned-on useful wavelengths may then advantageously be used here to set the emission power level of the selected wavelengths $\lambda_{B-ON}$.

Once the wavelengths $\lambda_{B-ON}$ of the filler signal $S_B$ have been selected, the filler signal $S_B$ may be generated (step S140), said signal being composed solely of the selected wavelengths, which are not modulated with useful data, and which correspond to the turned-off useful wavelengths of the emitting device 20.

This filler signal $S_B$ may then be injected (step S150) into the optical transmission line L, that it may thus optically load in addition to the useful optical signal $S_U$ transmitted over this line.

Of course, the invention is not limited to the example embodiments described above, on which, without however departing from the scope of the invention, other embodiments may possibly be based.

Thus, although a separate control module 15 comprising two submodules $15_1$ and $15_2$ controlling the generating module 11 and the selecting module 13, respectively, has been described, the functions of these two submodules may be united in a single control module, or indeed even be integrated directly into the generating and selecting modules 11, 13.

In addition, the order of the steps of the method illustrated in FIG. 2 is not obligatory and these steps may occur in a different order, provided that the second information is obtained before the generation of the signal $S_S$ (step S120), that the first information is obtained before the selection of the filler wavelengths (step S130), and that the generation of the signal $S_B$ (step S120) takes place before the selection of the filler wavelengths (step S130), the generation of the signal $S_B$ (step S140) and the injection of the signal $S_B$ (step S150).

Although the present disclosure has been described with reference to one or more examples, workers skilled in the art will recognize that changes may be made in form and detail without departing from the scope of the disclosure and/or the appended claims.

The invention claimed is:

1. A load-controlling device for controlling load on an optical transmission line having an input coupled to an emitting device suitable for modulating with data and multiplexing a plurality of useful wavelengths into a useful optical signal to be transmitted la the emitting device over the optical transmission line, the load-controlling device comprising:

generating means for generating a filler optical signal, which is composed of at least one filler wavelength that is not modulated by data, to be injected into the optical transmission line, the generating means being configured to generate at least one source optical signal composed of at least a plurality of wavelengths corresponding to the plurality of wavelengths of the useful optical signal and to select said at least one wavelength of the filler optical signal among the wavelengths of the at least one source optical signal; and a control module configured to control the selection, by the generating means, of said at least one wavelength of the filler optical signal depending on first information that is indicative of a non-turn-on of at least one wavelength among the plurality of wavelengths of the useful optical signal emittable by the emitting device.

2. The load-controlling device as claimed in claim 1, wherein the generating means comprise:

at least one module for generating a source optical signal controlled by the control module; and one wavelength-selecting module configured to receive the source optical signal and to select, on command from the control module, said at least one wavelength of the filler optical signal among the wavelengths of the at least one source optical signal.

3. The load-controlling device as claimed in claim 2, wherein the selecting module is furthermore configured to adjust a power level of said at least one wavelength of the selected filler optical signal depending on information relating to an emission power level of the useful wavelengths.

4. The load-controlling device as claimed in claim 2, wherein the control module is furthermore configured to control the generation of the wavelengths of the source optical signal corresponding to the wavelengths of the useful optical signal depending on second information relating to all of the useful wavelengths.

5. The load-controlling device as claimed in claim 4, wherein the second information comprises information relating to at least one of the spectral spacing between the useful wavelengths, a reference wavelength or the spectral position of each useful wavelength.

6. The load-controlling device as claimed in claim 5, wherein the module for generating the source optical signal comprises a broad spectrum optical source coupled to a periodic filter having a free spectral range managed by the control module in order to control adjustment of the spectral spacing between the wavelengths of the source optical signal.

7. The load-controlling device as claimed in claim 4, wherein the control module is configured to receive the second information from a control module for controlling optical emitters of the emitting device.

8. The load-controlling device as claimed in claim 2, wherein the wavelength-selecting module is a wavelength selective switch comprising attenuators commanded by the control module in order to turn off the wavelengths of the source optical signal that do not correspond to a non-turned-on useful wavelength.

9. The load-controlling device as claimed in claim 1, wherein the first information indicative of the non-turn-on of at least one useful wavelength comprises at least one of a list of turned-on wavelengths or a list of the non-turned-on wavelengths of the plurality of useful wavelengths.

10. The load-controlling device as claimed in claim 1, wherein the control module is configured to receive the first information from a control module for controlling optical emitters of the emitting device.

11. A system for emitting an optical signal to be transmitted over an optical transmission line, comprising:

an emitting device, suitable for modulating and multiplexing a plurality of useful wavelengths in order to deliver an optical signal to be transmitted over the optical transmission line; and a load-controlling device configured to inject a filler signal into the optical transmission line for controlling load on the optical transmission line, the load-controlling device comprising:

generating means for generating a filler optical signal, which is composed of at least one filler wavelength that is not modulated by data, to be injected into the optical transmission line, the generating means being configured to generate at least one source optical signal composed of at least a plurality of wavelengths corresponding to the plurality of wavelengths of the useful optical signal and to select said at least one wavelength of the filler optical signal among the wavelengths of the at least one source optical signal; and a control module configured to control the selection, by the generating means, of said at least one wavelength of the filler optical signal depending on first information that is indicative of a non-turn-on of at least one wavelength among the plurality of wavelengths of the useful optical signal emittable by the emitting device.

12. A load-controlling method comprising:

controlling load on an optical transmission line that is coupled to an emitting device that is able to modulate and multiplex a set of useful wavelengths in order to deliver a useful optical signal to be transmitted over the optical transmission line, wherein the controlling comprises:

obtaining first information indicative of a non-turn-on of at least one wavelength among the set of useful wavelengths emittable by the emitting device;

selecting, depending on the first information, at least one wavelength of a filler signal within at least one source optical signal comprising a plurality of wavelengths corresponding to the plurality of useful wavelengths;

generating a filler signal composed of said at least one selected wavelength; and injecting the filler signal into the optical transmission line.

13. The load-controlling method as claimed in claim 12, furthermore comprising:

obtaining second information relating to all of the useful wavelengths; and generating the source optical signal depending on said second information.

14. The load-controlling method as claimed in claim 13, wherein the first information comprises at least one of a list of non-turned-on useful wavelengths or a list of turned-on useful wavelengths and the second information comprises information relating to at least one of the spectral spacing between the useful wavelengths, the reference wavelength or the spectral position of each useful wavelength.

15. The load-controlling method as claimed in claim 13, wherein the obtaining the second information comprises receiving the second information from a control module for controlling optical emitters of the emitting device.

16. The load-controlling method as claimed in claim 12, wherein the obtaining the first information comprises receiving said the first information from a control module for controlling optical emitters of the emitting device.

\* \* \* \* \*